Figure 1:
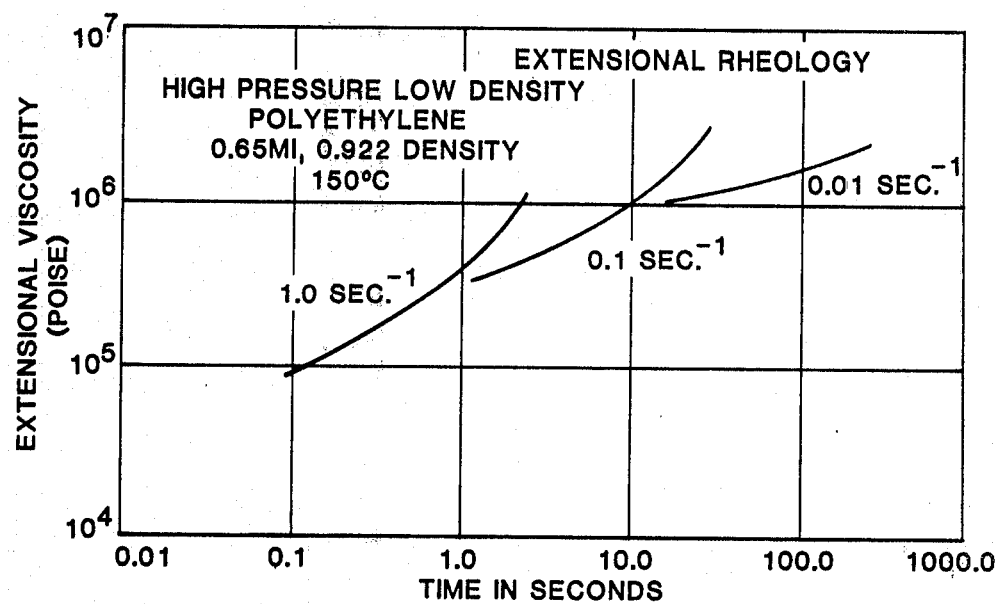

United States Patent [19]

Kurtz et al.

[11] 4,339,507
[45] Jul. 13, 1982

[54] LINEAR LOW DENSITY ETHYLENE HYDROCARBON COPOLYMER CONTAINING COMPOSITION FOR EXTRUSION COATING

[75] Inventors: Stuart J. Kurtz, Martinsville; Howard G. Apgar, Jr., Bedminster, both of N.J.

[73] Assignee: Union Carbide Corporation, Danbury, Conn.

[21] Appl. No.: 210,593

[22] Filed: Nov. 26, 1980

[51] Int. Cl.³ .................. B32B 27/32; B32B 27/30; B29C 19/00; B29F 3/10
[52] U.S. Cl. .................. 428/522; 156/244.11; 264/171; 427/385.5; 427/388.1; 427/391; 427/393.5; 428/336; 428/523; 525/222; 525/227; 525/240
[58] Field of Search .................. 427/393.5, 391, 388.1, 427/385.5; 428/522, 523, 336; 156/244.11; 525/240, 227, 222; 264/129, 131, 135, 171

[56] References Cited

U.S. PATENT DOCUMENTS 3,682,767  8/1972  Britton .................. 525/227
4,116,914  9/1978  Coran et al. .................. 525/222
4,232,132  11/1980  Grigo et al. .................. 525/222

OTHER PUBLICATIONS

Albright, L. F., "High Pressure Processes for Polymerizing Ethylene", *Chemical Engineering,* Dec. 19, 1966, pp. 113-120.

*Primary Examiner*—Michael R. Lusignan
*Assistant Examiner*—Thurman K. Page
*Attorney, Agent, or Firm*—James C. Arvantes

[57] ABSTRACT

An extrusion coating composition and a process for the extrusion coating of a substrate or article. The extrusion coating composition is comprised of greater than 20 and less than 98 weight percent of a high pressure low density polyethylene homopolymer and/or copolymer and greater than 2 and less than 80 weight percent of at least one linear low density ethylene hydrocarbon copolymer.

23 Claims, 5 Drawing Figures

LINEAR LOW DENSITY ETHYLENE HYDROCARBON COPOLYMER CONTAINING COMPOSITION FOR EXTRUSION COATING

BACKGROUND OF THE INVENTION

(1) Field of Invention

This invention relates to a novel extrusion coating composition comprised of a linear low density ethylene hydrocarbon copolymer and a high pressure low density polyethylene homopolymer and/or copolymer and a process for extrusion coating of a substrate or article.

(2) Description of the Prior Art

Long chain branched (LCB), low density polyethylene homopolymers and/or copolymers are polymerized in heavy walled autoclaves or tubular reactors at pressures greater than 15,000 psi and as high as 50,000 psi and at temperatures up to 300° C. As used herein, a "LCB, low density polyethylene homopolymer and/or copolymer" refers to a high pressure, low density polyethylene homopolymer and/or copolymer (also herein referred to as a "high pressure, low density polyethylene"). The molecular structure of high pressure, low density polyethylene is highly complex. The permutations in the arrangement of its simple building blocks are essentially infinite. High pressure, low density polyethylene resins are characterized by an intricate long chain branched molecular architecture. These long chain branches have a dramatic effect on the melt rheology of the resins. High pressure, low density polyethylene resins also possess a spectrum of short chain branches, generally 1 to 8 carbon atoms in length, which control resin crystallinity (density). The frequency distribution of these short chain branches is such that, on the average, most chains possess the same average number of branches. The short chain branching distribution characterizing high pressure, low density polyethylene can be considered narrow.

Low density ethylene hydrocarbon copolymers can be produced at low to medium pressures by copolymerizing ethylene with various alpha-olefins using heterogeneous catalysts based on transition metal compounds of variable valence. These low pressure, low density ethylene hydrocarbon copolymer resins are referred to herein as linear, low density ethylene hydrocarbon copolymer resins. These resins generally possess little, if any, long chain branching and the only branching to speak of is short chain branching. Branch length is controlled by comonomer type. Branch frequency is controlled by the concentration of comonomer(s) used during copolymerization. Branch frequency distribution is influenced by the nature of the transition metal catalyst used during the copolymerization process. The short chain branching distribution characterizing transition metal catalyzed low density polyethylene can be very broad.

Low density polyethylene homopolymer and/or copolymer, in general, can exhibit a multitude of properties. It is flexible and has a good balance of mechanical properties such as tensile strength, impact resistance, burst strength, and tear strength. In addition, it retains its strength down to relatively low temperatures. Certain resins do not embrittle at temperatures as low as −70° C. Low density polyethylene homopolymer and/or copolymer, in general, has good chemical resistance. It is relatively inert to acids, alkalis, and inorganic solutions. It is, however, sensitive to hydrocarbons, halogenated hydrocarbons, and to oils and greases.

Linear, low density polyethylene homopolymer and/or copolymer, in general, has excellent dielectric strength.

Heretofore, linear, low density ethylene hydrocarbon copolymers have not been commercially employed as extrusion coating compositions. However, high pressure, low density polyethylene is employed for extrusion coating of substrates such as aluminum, paper, polypropylene, polyester, etc. One example of a high pressure, low density polyethylene resin typically used in extrusion coating is a stirred autoclave reactor resin, since it provides, in general, higher extrusion coating rates than can be achieved with tubular reactor resins.

SUMMARY OF THE INVENTION

(1) Definitions

By draw-down is meant the stretching of an extruded web of film in the direction of flow and sometimes also in the transverse direction.

By draw ratio is meant the extrudate velocity in take-up divided by the extrudate velocity emerging from a die.

By draw resonance or surging is meant a limit cycle corresponding to a sustained periodic oscillation in the velocity and cross-sectional area of a drawing process when the boundry conditions are a fixed velocity at the exit of an extruder and a fixed velocity at the take-off position. It occurs when the draw ratio exceeds a critical value. Draw resonance or surging can be thought of as an instability in take-off phenomenon of a material coming from an extruder, more or less homogeneously. The instability manifests itself in the occurrence of periodic fluctuations in the extrudate dimensions such as film thickness when a critical value of the take-up speed is exceeded. Surging may be so extreme as to actually break a web or film that extrudes from a die and totally shut down an extrusion coating process.

By melt strength is meant the stress required to break a melt extrudate. When a melt extrudate is drawn-down, at some sufficiently high elongation rate, the stress required to deform the material is greater than the cohesive strength of the material and the extrudate breaks.

By neck-in is meant the reduction in film web width as it is extruded from a die and which will be caused by a combination of swelling and surface tension effects as the material leaves the die. In short, neck-in is the difference in distance between the extrudate web as it emerges from the die minus the width of the extrudate web as it is taken up, that is, the difference between the die width and the web width as it is taken up is considered the neck-in.

(2) Objects of the Invention

It is an object of this invention to provide an improvement in an extrusion coating process wherein the improvement comprises using an extrusion coating composition comprised of a linear, low density ethylene hydrocarbon copolymer and a high pressure, low density polyethylene homopolymer and/or copolymer.

Another object is to provide an improved extrusion coating composition comprised of the polymers herein defined.

Another object of this invention is to provide an improved extrusion coating composition which is essentially free of pinholes, has good adhesion characteristics and which has been formed by an extrusion coating process at a high coating speed and with low neck-in.

A further object of this invention is to improve the rheology of a high pressure, low density polyethylene coating composition by the addition thereto of a linear, low density ethylene hydrocarbon copolymer, thus allowing running rates in an extrusion coating process to be increased at least about 50% without melt breakage occurring.

Another object of this invention is to provide a coated substrate or article wherein the coating comprises an extrusion coating composition as defined herein which has been adherently applied onto the article or substrate via an extrusion coating process.

An object of this invention is to provide a homogeneous blend of resins as an extrusion coating composition which will provide a coating having a uniform thickness on a substrate or article in an extrusion coating process.

(3) Brief Description of the Invention

It now has been found that a process for extrusion coating of a high pressure, low density polyethylene containing composition can be improved by using as the extrusion coating composition a blend comprised of more than 20% and less than 98% of a high pressure, low density polyethylene and more than 2% and less than 80% of a linear low density ethylene hydrocarbon copolymer. The advantages of using such a composition in an extrusion coating process are that a coating which is essentially free of pinholes and which has good adhesion can be produced economically. In addition, a process having improved practicable running rates, that is, higher coating speeds, is provided while an acceptable neck-in is maintained, that is, a neck-in less than about 2-3 inches.

In one aspect, this invention relates to an improved process for the extrusion coating of a substrate with a high pressure, low density polyethylene homopolymer or copolymer based extrusion coating composition, the improvement which comprises:

using as said composition one comprising more than 20 and less than 98 weight percent of said high pressure, low density polyethylene homopolymer and/or copolymer and more than 2 and less than 80 weight percent of at least one linear, low density ethylene hydrocarbon copolymer.

In another aspect, this invention also relates to a process for applying an extruded coating to a substrate at a temperature of at least 450° F. In such a process, a coating composition containing a high pressure, low density polyethylene homopolymer or copolymer is fed into an extruder and converted into an extrudate which is drawn down onto a substrate to coat the substrate. The coating formed is essentially free of pinholes and has a thickness below about 0.5 mils, preferably between about 0.25 mils and about 0.5 mils. The improvement in such a process, according to this invention comprises:

operating the extruder at coating speeds greater than 600 ft/min to apply the coating to the substrate, in the absence of neck-in greater than about 3 inches; and using as the coating composition one comprising more than 20 and less than 98 weight percent of the high pressure, low density polyethylene homopolymer or copolymer and more than 2 and less than 80 weight percent of a linear, low density ethylene hydrocarbon copolymer.

In still another aspect, this invention further relates to an extrusion coating composition comprising more than 20 and less than 98 weight percent of high pressure, low density polyethylene homopolymer and/or copolymer and more than 2 and less than 80 weight percent of linear, low density ethylene hydrocarbon copolymer.

(4) Detailed Description of the Invention

As mentioned previously herein, linear, low density ethylene hydrocarbon copolymers heretofore have not been used commercially as extrusion coating compositions. Extrusion coating resins are thought to have certain characteristics. For example, in general, the highest coating speeds have been obtained with extrusion coating resins having the lowest melt strength. See Kaltenbacher et al., "The Use of Melt Strength in Predicting the Processability of Polyethylene Extrusion Coating Resins", 50 TAPPI 20-26 (January 1967). Linear, low density ethylene hydrocarbon copolymers are thought to possess low melt strength which would lead one skilled in the art to believe that they would provide good extrusion coating compositions.

However, applicants have found that there are deficiencies associated with the use of unmodified, linear, low density ethylene hydrocarbon copolymer resins as extrusion coating compositions. Process deficiencies included draw resonance and high neck-in. Draw resonance can lead to melt breakage. High neck-in often can lead to a large edge bead volume. Product deficiencies included poor adhesion at melt temperatures less than 500° F., pinholes and increased polymer degradation at melt temperatures greater than 550° F.

In an extrusion coating process, the most significant deficiency in the use of unmodified, linear, low density ethylene hydrocarbon copolymer was that of draw resonance. Draw resonance, in this case, occurred at draw ratios that were exceptionally low, i.e., the amount of drawdown that could be done was not adequate for proper fabrication. When unmodified, linear, low density ethylene hydrocarbon copolymer was used for extrusion coating, maximum stable draw ratios were found to be less than 10 to 1. In most commercial extrusion coating operations, draw ratios greater than 20 to 1 are sought.

Another deficiency of extrusion coating processes using an unmodified, linear, low density ethylene hydrocarbon copolymer was that of excessive neck-in. In extrusion coating, for a given die width, the width of the extrudate material drawn onto the take-off roll is smaller than that of the die. If the neck-in is too great, material usage is very inefficient and costly. For very large dies, small differences, percentagewise, may not be important.

According to the present invention, applicant has found that by blending linear, low density ethylene hydrocarbon copolymers with high pressure, low density polyethylene, extrusion coating compositions are provided which are capable of high draw-downs without draw resonance or melt breakage. In fact, certain blends of the present invention provide higher drawdowns without draw resonance or melt breakage than can be achieved with either of the components of the blend by themselves. With the extrusion coating compositions of this invention, however, neck-in less than about 3 inches at coating speeds greater than 600 ft/min has been achieved for pinhole free coatings, even those having a thickness less than about 0.5 mils.

LOW DENSITY POLYETHYLENE: RHEOLOGY

The rheology of polymeric materials depends to a large extent on molecular weight and molecular weight distribution. Studies of high pressure low density polyethylene have also shown the importance of long chain branching. In extrusion coating, two aspects of rheological behavior are important: shear and extension. Within a film extruder and extrusion die, a polymeric melt undergoes severe shearing deformation. As the extrusion screw pumps the melt to and through an extrusion coating die, the melt experiences a wide range of shear rates. Most film extrusion processes are thought to expose the melt to shear at rates in the 100–5000 sec$^{-1}$ range.

Polymeric melts are known to exhibit what is commonly termed shear thinning behavior, i.e., non-Newtonian flow behavior. As shear rate is increased, viscosity (the ratio of shear stress, $\tau$ to shear rate, $\dot{\alpha}$) decreases. The degree of viscosity decrease depends upon the molecular weight, its distribution and molecular conformation, i.e., long chain branching of the polymeric material. Short chain branching has little effect on shear viscosity. In general, broad molecular weight distribution resins show enhanced shear thinning behavior in the shear rate range common to extrusion coating. Long chain branching can also enhance this behavior. Narrow molecular weight distribution resins exhibit reduced shear thinning behavior at extrusion grade shear rates.

The consequences of the aforementioned differences in the effect of molecular structure on shear thinning are that narrow distribution resins (such as linear, low pressure, ethylene hydrocarbon copolymers) require higher power and develop higher pressures during extrusion than broad molecular weight distribution resins (such as high pressure, low density polyethylenes) of equivalent average molecular weight. In order to compensate for high die pressures, it is often necessary to run with relatively large die gap openings, e.g., greater than 20 mils. Such die gap openings require a high draw down, usually greater than 20 to 1.

The rheology of polymeric materials is customarily studied in shear deformation. In shear, the velocity gradient of the deforming resin is perpendicular to the flow direction. This mode of deformation is experimentally convenient but does not convey the essential information for understanding material response in extrusion coating processes. As one can define a shear viscosity in terms of shear stress and shear rate, i.e.,:

$$\eta \text{ shear} = \tau\,12/\dot{\alpha} \qquad (1)$$

where
$\eta$ shear = shear viscosity (poise)
$\tau\,12$ = shear stress (dynes/cm$^2$)
$\dot{\alpha}$ = shear rate (sec$^{-1}$)
an extensional viscosity can be defined in terms of normal stress and strain rate, i.e.:

$$\eta_{ext} = \pi/\dot{\epsilon} \qquad (2)$$

$\eta_{ext}$ = extensional viscosity (poise)
$\pi$ = normal stress (dynes/cm$^2$)
$\dot{\epsilon}$ = strain rate (sec$^{-1}$)
In pure extensional flow, unlike shear flow, the velocity gradient is parallel to the flow direction. Commercial extrusion processes involve both shear and extensional deformations. In extrusion coating, as well as in film extrusion (tubular blown and slot cast) the extensional rheology characteristics of a resin are exceedingly important. They may, in fact, dominate the process.

Extensional viscosity can be measured by a number of experimental techniques (see, for example, J. L. White, Report No. 104 of the Polymer Science and Engineering Dept., Univ. of Tenn., Knoxville). The procedure used herein is a constant strain rate method. Briefly, the method uses a servo-controlled Instron tensile testing machine. The ends of a molten ring of polymer, immersed in a silicone oil bath, are separated at an accelerating rate according to the following relationship.

$$L(t) = L_o \exp(\dot{\epsilon}t) \qquad (3)$$

where
$L(t)$ = jaw separation at time t.
$L_o$ = initial jaw separation
$\dot{\epsilon}$ = strain rate (sec$^{-1}$), a constant
t = time
A force transducer measures load during the deformation. Extensional viscosity is calculated by dividing stress by strain rate and is determined as a function of displacement or time during the deformation (Temp. 150° C.).

When high pressure, low density polyethylene melts are deformed according to equation (3), extensional viscosity is observed to increase at an accelerating rate with log time. This behavior is shown in FIG. 1, a plot of extensional viscosity vs. log time for a high pressure polymerized, low density polyethylene having a melt index of 0.65 and a density of 0.922 gm/cm$^3$. The melt is said to strain harden. This strain hardening intensifies as the strain rate is increased. In some cases, the melt appears to exhibit unbounded stress growth.

Figure 2:
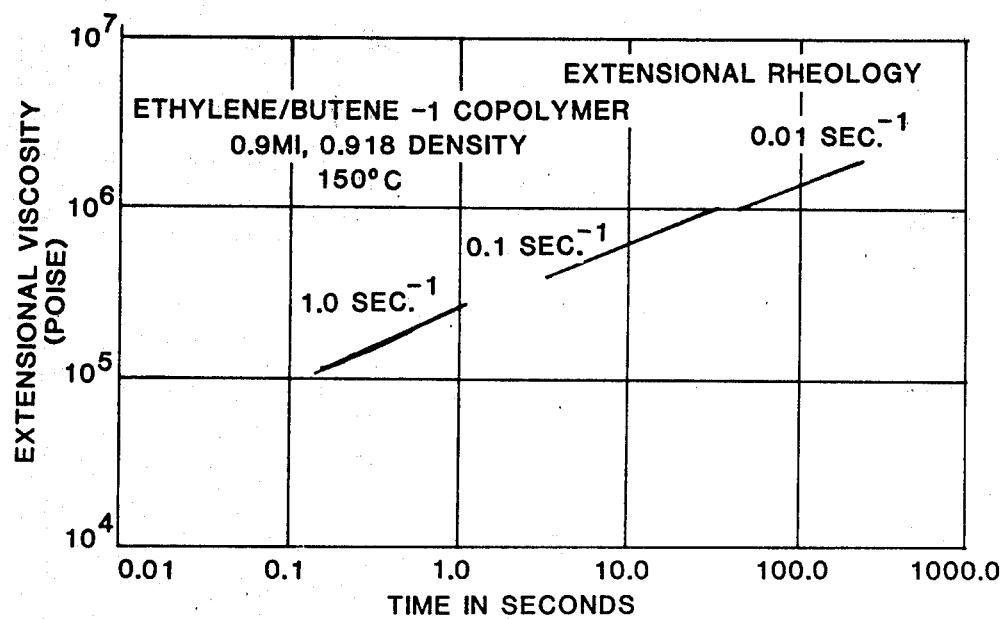
Figure 3:
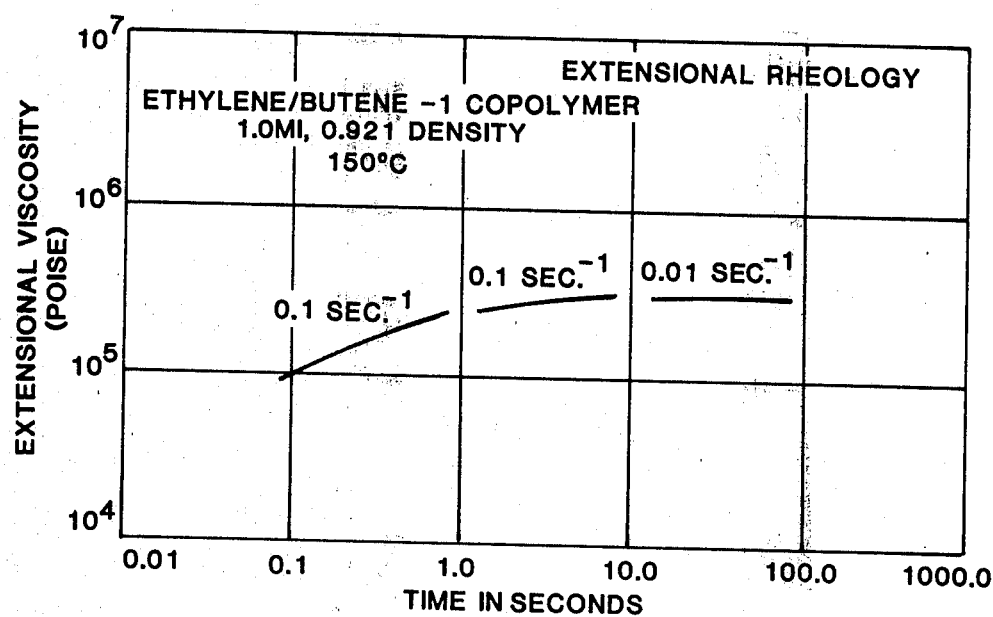

Transition metal catalyzed, ethylene hydrocarbon copolymers do not, in general, show unbounded stress growth. Certain broad molecular weight distribution resins do strain harden, but their extensional viscosity seems to increase linearly with log time (see FIG. 2), a plot of extensional viscosity vs. log time for an ethylene-butene-1 copolymer having a melt index of 0.9 and a density of 0.918 g/cm$^3$. Certain narrow molecular weight distribution resins, such as those which are herein described, show little strain hardening when strain rates are low. FIG. 3, a plot of extensional viscosity vs. log time for an ethylene-butene-1 copolymer having a melt index of 1.0 and a density of 0.921 g/cm$^3$, shows that strain hardening intensifies at higher strain rates but not to the degree observed in high pressure, low density polyethylene.

High pressure, low density polyethylene can be considered "soft" in shear and "stiff" in extension when compared to ethylene hydrocarbon copolymers of narrow molecular weight distribution. Ethylene hydrocarbon copolymers having a narrow molecular distribution exhibit the opposite rheology. They are "stiff" in shear and "soft" in extension. The terms "soft" and "stiff", as used herein, refer to the relative magnitude of shear and extensional viscosity when comparing the rheology of high pressure, low density polyethylene and narrow molecular distribution ethylene hydrocarbon copolymers.

The consequences of the differences in strain hardening as shown in the extensional viscosity characteristics are as follows. High pressure, low density polyethylene resins tend to build up stress at high extrusion coating rates and drawdowns in an extrusion coating process. When the "high pressure" resins reach a point where the stress exceeds the melt strength, the resins break or rupture. In contrast to the behavior of high pressure, low density polyethylene resins, low pressure, low density ethylene hydrocarbon copolymer resins can be drawn down considerably without reaching stresses to cause melt breakage. On the other hand, by not building up significant stresses with drawing, it is believed that a low pressure, low density polyethylene melt becomes more susceptible to draw resonance.

While not wishing to be bound by any theory of the actual rheological behavior of the blends of this invention, it is believed that the addition of the "low pressure" resin to the "high pressure" resin reduces the stress buildup and thus delays the initiation of melt breakage. Also, it is believed that the presence of the "high pressure" resin in the blend makes the blend less susceptible to draw resonance. Applicants have discovered that the particular concentration ranges of the components of the blends, as defined herein, provide extrusion coating compositions useful for increasing coating speeds while retaining low neck-in, good adhesion and pinhole free coatings in an extrusion coating process, even for very thin coatings.

Figure 4:
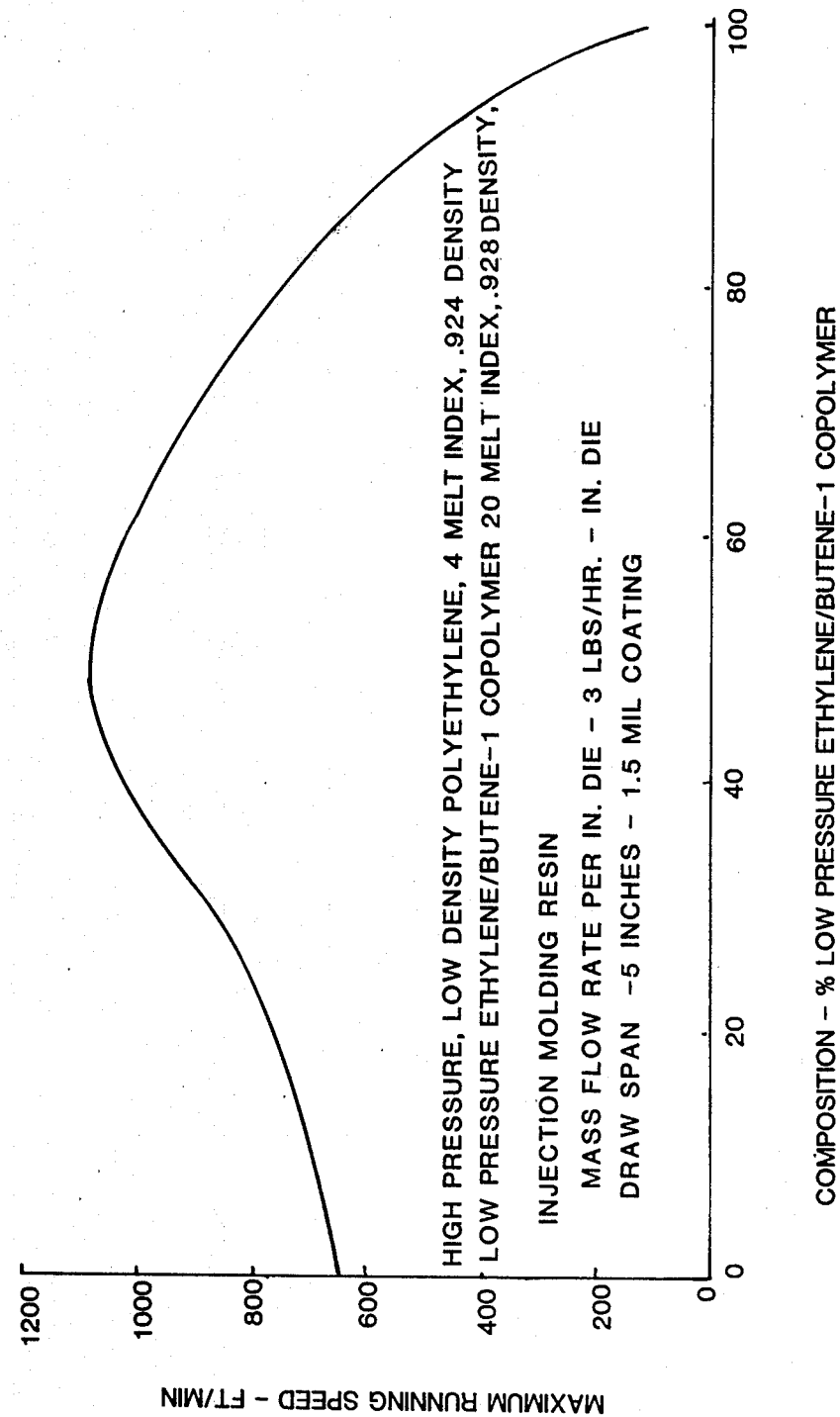

FIG. 4 is a plot which shows maximum running speed as a function of weight percent of a 20 Melt Index, linear, low density ethylene copolymer in a 4 Melt Index, high pressure, polyethylene blend which comprises an extrusion coating composition. FIG. 4 was derived from data gathered in an extrusion coating process by increasing the take-off speed until the web became unstable or broke for various blends of linear and high pressure, low density resins. As can be seen in FIG. 4, the addition of between 20 and 80 weight percent linear, low density resin to the blend significantly improves the maximum running speed obtainable in an extrusion coating process.

Figure 5:
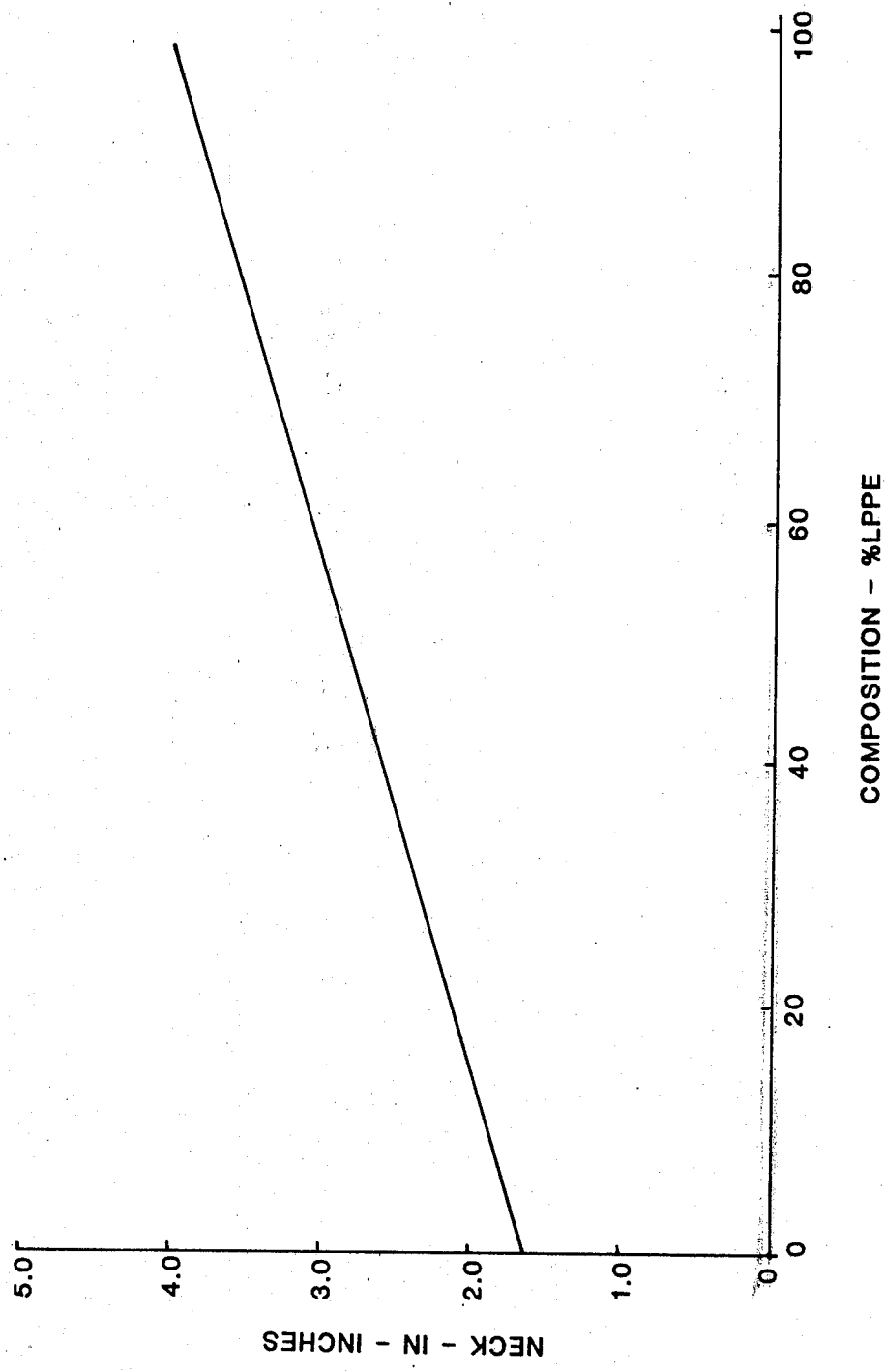

FIG. 5 is a plot which shows neck-in characteristics as a function of weight percent of a 20 Melt Index linear, low density ethylene copolymer in the blend used in FIG. 4. FIG. 5 was derived from data gathered in an extrusion coating process producing a 1.5 mil thick coating on a 40 lb. Kraft paper substrate by measuring neck-in from a 12 inch die at a mass flow rate per inch of die of 3 lbs/hr-inch of die. As can be seen in FIG. 5, addition of up to about 60 weight percent of a linear, low density resin to this particular blend was possible before neck-in exceeded 3 inches.

HIGH PRESSURE, LOW DENSITY POLYETHYLENE

High pressure, low density polyethylene refers to polyethylene that has a density up to about 0.93 and preferably, from about 0.91 to about 0.92 grams/cm$^3$. The high pressure, low density polyethylene is made commercially by the well-known high pressure process, utilizing free radical initiators. In such process, ethylene is homopolymerized with free radical catalysts under pressures greater than 15,000 psi and up to 50,000 psi at temperatures up to 300° C. in tubular or stirred reactors in the absence of solvents. Also useful, and within the scope of the present invention are copolymers of ethylene with a vinyl monomer (e.g., vinyl acetate); alpha-alkyl acrylic acids such as ethyl ethyl acrylate; and other alpha olefins in minor concentration providing copolymers having a density between about 0.91 to about 0.93 gram/cm$^3$.

The extrusion coating composition of this invention comprises greater than 20, preferably greater than 30, and most preferably greater than 40 weight percent of the high pressure, low density polyethylene. Moreover, the extrusion coating composition of this invention also comprises less than 98, preferably less than 90, and most preferably less than 80 weight percent of the high pressure, low density polyethylene.

LINEAR, LOW DENSITY ETHYLENE HYDROCARBON COPOLYMERS

Suitable linear, low density ethylene hydrocarbon copolymers for the extrusion coating compositions of the present invention are those copolymers of ethylene and one or more $C_3$ to $C_8$ alpha olefins having a density of about $\geq 0.912$ to $\leq 0.940$ and preferably of about $\geq 0.916$ to $\leq 0.928$. These copolymers can be made in a solution, slurry or gas phase process well known to those skilled in the art.

Also, suitable linear, low density ethylene hydrocarbon copolymers of this invention are those having a major mol percent $\geq 85$ of ethylene and a minor mole percent ($\leq 15$) of one or more $C_3$ to $C_8$ alpha olefins. The $C_3$ to $C_8$ alpha olefins include propylene, butene-1, pentene-1, heptene-1, 4-methyl pentene-1, hexene-1, and octene-1. The copolymers of this invention also have a volatiles content (TEA thermal evolution analysis) of about 0.05 to 0.35 weight percent).

Melt index of a polymer is a reflection of its molecular weight. Polymers having a relatively high molecular weight have a relatively low melt index. The melt index of the polymers useful in this invention is a function of a combination of the polymerization temperature of the reaction, the density of the polymer and the transition metal (e.g., titanium) content of the catalyst employed. Thus, the melt index is raised by increasing the polymerization temperature and/or by decreasing the density of the polymer (by increasing the comonomer ethylene ratio) and/or by increasing the transition metal content of the catalyst. When the melt index is too low, running speed of an extruder is adversely affected and so is fabrication performance. The extruder's power requirements may be excessive. When the melt index is too high, the resin provides an extruded coating having a higher frequency of pinholes and extruding such resin can result in plating-out on draw-rolls.

Linear, low density ethylene hydrocarbon copolymers of the present invention should have a standard melt index of $\geq \frac{1}{2}$, preferably $\geq 2$ and most preferably $\geq 10$. Also, copolymers of this invention should have a standard melt index $\leq 100$, preferably $\leq 50$, and most preferably $\leq 30$.

Preferred linear low density ethylene hydrocarbon copolymers for use in the extrusion coating compositions of the present invention are those possessing a molecular weight distribution, Mw/Mn, of $\geq 2.7$ to $\leq 4.1$ and preferably of about $\geq 2.8$ to $\leq 3.4$. These copolymers have a melt flow ratio of about $\geq 22$ to $\leq 32$ and preferably, $\geq 25$ to $\leq 32$. The melt flow ratio of $\geq 22$ to $\leq 32$ thus corresponds to a Mw/Mn value range of about 2.7 to 3.6 and the melt flow ratio range of $\geq 25$ to $\leq 32$ corresponds to a Mw/Mn range of about 2.8 to 3.6. These ethylene hydrocarbon copolymers also have a total unsaturation content of about $\geq 0.1$ to $\leq 0.3$ C=C per 1000 carbon atoms and preferably of about $\geq 0.14$ to $\leq 0.24$ C=C per 1000 carbon atoms.

Preferred linear, low density ethylene copolymers for use in the present invention include those which may be produced in accordance with the procedures set forth in U.S. patent application Ser. No. 892,325, filed Mar. 31, 1978, abandoned and refiled as Ser. No. 014,414 on Feb. 27, 1979, now U.S. Pat. No. 4,302,566 in the names of F. J. Karol et al. and entitled "Preparation of Ethylene Copolymers in Fluid Bed Reactor", and the procedures set forth in U.S. patent application Ser. No. 892,322, filed Mar. 31, 1978, abandoned and refiled as Ser. No. 012,720 on Feb. 16, 1979, now U.S. Pat. No. 4,302,565 in the names of G. L. Goeke et al. and entitled "Impregnated Polymerization Catalyst, Process for Preparing, and Use for Ethylene Copolymerization" as well as procedures which will produce ethylene hydrocarbon copolymers with properties as heretofore described. U.S. application Ser. No. 014,414 corresponds to European patent a6plication No. 79100953.3 which was opened to the public on Oct. 17, 1979 as Publication No. 4645 and U.S. application Ser. No. 012720 corresponds to European patent application No. 79100958.2 which was opened to the public on Oct. 17, 1979 as Publication No. 4647. The disclosures of Publications Nos. 4645 and 4647 are incorporated herein by reference.

Other linear, low density ethylene hydrocarbon copolymers preferred for use in the present invention are those which may be prepared as described in U.S. Pat. No. 4,011,382, entitled "Preparation of Low and Medium Density Ethylene Polymer in Fluid Bed Reactor" by I. J. Levine et al., the disclosure of which is incorporated herein by reference.

The extrusion coating composition of this invention comprises greater than about 2, preferably greater than about 10, and most preferably greater than about 20 weight percent of a linear, low density ethylene hydrocarbon copolymer. Moreover, the extrusion coating composition of this invention also comprises less than about 80, preferably less than about 70, and most preferably less than about 60 weight percent of the linear, low density ethylene hydrocarbon copolymer.

EXTRUSION COATING COMPOSITIONS

The extrusion coating compositions of the present invention may be used in any of the forms of such compositions which are commonly employed in the extrusion coatings art. Extrusion coating compositions of this invention optionally may contain between 100 and 1000 ppm of various chill roll release agents such as low molecular weight polyethylene glycol and fatty acid amides; between 1 and 15% by weight, respectively, of fillers and pigments such as carbon black, titanium dioxide, clays, diatomaceous earth, calcium carbonate and the like; between 20 and 150 ppm of antioxidants, such as butylated hydroxytoluene and hindered phenols, and the like.

EXTRUSION COATING CONDITIONS

The blends of linear, low density ethylene hydrocarbon copolymers and high pressure, low density polyethylene homopolymers and/or copolymers, as described herein, may be extruded directly on a variety of substrates to form composite sheets or articles by methods which are well known in the art. The substrates include materials such as polyethylene, paper, aluminum foil, etc. The coating equipment may include a single extrusion line or more than one extrusion line in order to apply multiple layers of substrates together.

Extrusion may be accomplished via a screw-type extruder which comprises a plastic material feed section, one or more screws enclosed in an extruder barrel, a mixing section at the end of the one or more screws, and a forming die beyond the mixing section. In such an extrusion apparatus, the polymer in a dry, granular form is fed from a hopper to the feed section of the extruder and forwarded by rotation of the screws, passes through the extruder barrel wherein it is heated and mechanically worked to melt the polymer before it emerges from the forming die under high pressure as a web.

In a typical extrusion coating operation according to this invention, a high pressure, low density polyethylene and a linear, low density ethylene hydrocarbon copolymer are uniformly dispersed in one another. The dispersion can be effected by various dispersion techniques commonly employed by those skilled in the art of preparing extrusion coating compositions. Such procedures would include dry blending by means of a Henshel intensive mixer, a ribbon blender or tumbling; or hot compounding in a Banbury, Stewart Bolling, or Werner Pfliederer compounding extruder, Farrell continuous mixer, or other similar equipment.

The resins to be blended may be used in the form of powders, pellets, granules, or any form that can be fed to an extruder.

In a typical extrusion coating operation, the blend is fed into an extruder hopper. By gravity feed, the blend goes into a standard polyethylene screw in an extrusion coating extruder. The polymer blend enters the feed section as a solid and is conveyed, compressed and begins melting in the transition section of the screw extruder. It then proceeds with the melting and pumping into a so-called metering section of the screw, at which point temperature also increases, possibly assisted by heat transfer to the melt on the barrel side. The melt then flows through the extruder, optionally past a mixing head to eliminate any unmelting material and to homogenize the melted material, optionally also followed by another metering section which will increase the pumping to a pressure necessary to extrude through the die. The melt is more or less homogeneous in temperature and uniformity as it passes through and out of the die forming a web. This web then is extruded onto a substrate through a nip roll such that the web is pressed onto the substrate. The web is cooled by a chill roll forming a nip and drawn off with the substrate onto other take-up rolls. It then proceeds through various treatment stations to a wind-up system where the coated substrate can then be wound up.

In the extruder, the resin blend is subjected to temperatures ranging from 50° F. below ambient up to 650° F. The extrudate emerges at temperatures from 275° F. to 650° F., preferably from 375° F. to 650° F., under varying conditions of head pressure. Average Residence times in the extruder can vary from about 0.5 to 15 minutes. The extrusion coating is usually formed in a uniform thickness of from about 0.1 to 10 mils thick.

PROPERTIES OF THE BLEND

One requirement of a good extrusion coating composition is a homogeneous extrudate. The homogeneous extrudate should not have poor dispersion which might occur in some cases where one of the components of the composition (blend) has very high molecular weight relative to the second component. The properties of the present blend have advantages over either of the individual components of the blends separately in both processing and some product properties. In processing, the present blends can give stable extrusion rates at very high take-off speeds that are greater than that can be achieved with either the single components, at acceptable neck-in conditions and with good product properties such as good adhesion to the substrate, few pinholes in the coating, a small edge bead volume, good tensile strength, flexibility over a wide temperature range, low permeability, good heat seal, tear and abrasion resistance. With respect to these above-mentioned properties, the blends of the present invention are comparable to the existing prior art systems. With respect to the fabrication performance, the blends of the present invention exceed the prior art systems.

The following examples are designed to illustrate the process and compositions of the present invention and are not intended as a limitation on the scope thereof.

EXAMPLES 1–15

Resins Employed

Two high pressure, low density polyethylene resins in pellet form were used, either alone as control examples or in blends. The two "high pressure" resins used were stirred autoclave reactor resins. One of the "high pressure" resins was a homopolymer of ethylene having a melt index of 4.36 grams/10 min and a density of 0.924 gm/cm$^3$ and the other had a melt index of 6.3 grams per 10 min and a density of 0.918 (commercially available as Alathon 1540 from E. I. duPont deNemours & Co., Wilmington, Del.).

Five linear, low density ethylene-butene-1 copolymers in granular form were used in the blends and two of the five also were used alone as control examples. The five ethylene-butene-1 copolymer resins used can be prepared using the catalyst and procedures described in South African Patent Publication No. 79-01365, published Sept. 22, 1980, entilted "Process for Making Film From Low Density Ethylene Hydrocarbon Copolymer" by W. A. Fraser et al.

PREPARATION OF BLENDS

Blends useful as extrusion coating compositions according to the present invention were prepared by admixing various weight percents of one of the two aforementioned "high pressure" resins with various weight percents of one or more of the five aforementioned ethylene-butene-1 copolymers in a drum to form a 100 lb. blend. The drum was tumble blended for at least 20 minutes to form a homogeneous blend suitable as an extrusion coating composition. Controls and blends which were employed and their physical properties are summarized in Table I hereinbelow:

TABLE I

| Example | Resin/Blend | Melt Index (dg/min) (44 psi) | Melt Flow Ratio | Density (g/cm$^3$) |
|---|---|---|---|---|
| 1 | high pressure, low density homopolymer of ethylene prepared in stirred autoclave reactor | 4.36 | ~31 | 0.924 |
| 2 | high pressure, low density polyethylene prepared in stirred autoclave reactor | 6.3 | ~35 | 0.918 |
| 3 | ethylene-butene-1 copolymer (GRSN 7043) | 3 | ~25 | 0.920 |
| 4 | ethylene-butene-1 copolymer (GRSN 7146) | 12 | ~28 | 0.9265 |
| 5 | ethylene-butene-1 copolymer (GRSN 7144) | 20 | ~28 | 0.924 |
| 6 | ethylene-butene-1 copolymer (GRSN 7042) | 2 | ~28 | 0.918 |
| 7 | ethylene-butene-1 copolymer (GRSN 7140)* | 20 | ~28 | 0.924 |
| 8 | 75% resin of example 3; 25% resin of example 2 | 2.6 | ~28 | 0.9201 |
| 9 | 37.5% resin of example 3; 37.5% resin of example 4; 25% resin of example 2 | 5.49 | ~24 | 0.9224 |
| 10 | 75% resin of example 7; 25% resin of example 1 | 13.5 | ~24 | 0.9293 |
| 11 | 75% resin of example 7; 25% resin of example 2 | 13 | ~26 | 0.9267 |
| 12 | 75% resin of example 7; 25% resin of example 2 | | | |
| 13 | 75% resin of example 4; 25% resin of example 2 | | | |
| 14 | 80% resin of example 3; 25% resin of example 2 | | | |
| 15 | 85% resin of example 3; 15% resin of example 2 | | | |

*GRSN 7043, 7146, 7144, 7042, and 7140 are resins commercially available from Union Carbide Corporation, 270 Park Avenue, New York, New York The ethylene-butene-1 copolymer resins of examples 3 and 4 and the blends of examples 8–15 set forth herein were each stabilized with 50 ppm of a hindered phenol antioxidant used for extrusion coating resins. In addition, a nitrogen purge (2 SCFH) was used on the hopper for runs 3–12 subsequently set forth as an extra and optional precautionary measure (a nitrogen purge is known to prevent film streaking in blown film production.

EXTRUDER APPARATUS EMPLOYED

A 2½ inch Royle extruder having a barrel length to diameter of 27 to 1 and a 24 to 1 length to diameter ratio polyethylene screw was employed. The extruder had a 50 horsepower dynamatic drive and 5 barrel heating zones. A 12 inch semi-coathanger type die which was end fed, had a final land length of ⅜ inch, and a die-gap setting of approximately 20 mils was employed. The coating unit was as Egan unit having a laminiating station 28 inches wide and included a payoff roll, a preheat drum, a chill roll and windup roll. Extrusion rates were controlled by RPM settings of the extruder. Coating thickness was controlled by the line speed of the coating unit. The extruder barrel settings were between 500° F. and 600° F., typically about 600° F.

EXTRUSION COATING CONDITIONS

Blends and individual resins were extruded using the extrusion coating equipment previously described herein. The following extrusion coating conditions were the same for all of the runs: substrate—40 lb. Kraft paper; die temperature—600° F. (zones land 2); NIP pressure (lbs/lineal inch)—100; lead in (inches)—0; draw span (inches)—3; coating speed (ft/min-)—80/120/250; coating thickness (mils)—1.5/1.0/10.5; chill roll water temp. (°F.)-55; chill roll water flow (gpm)—90; and percent of screw cooled—neutral.

Table II hereinbelow shows the extrusion coating conditions which varies for twelve runs using various blends and control resins:

TABLE II

Extrusion Coating Conditions on Egan Extruder Coating Line

| | Run No. | | | | | | | | | | | |
|---|---|---|---|---|---|---|---|---|---|---|---|---|
| Resin/Blend | 1 | 2 | 3 | 4 | 5 | 6 | 7 | 8 | 9 | 10 | 11 | 12 |
| | resin of ex. 1 | resin of ex. 2 | resin of ex. 3 | resin of ex. 4 | blend of ex. 8 | blend of ex. 9 | blend of ex. 10 | blend of ex. 11 | blend of ex. 12 | blend of ex. 13 | blend of ex. 14 | blend of ex. 15 |
| Extrusion rate (lbs/hr) | 37 | 37 | 37 | 37 | 36 | 35 | 37 | 37 | 35 | 36 | 35 | 35 |
| Screw speed (RPM) | 29 | 27 | 27 | 33 | 29 | 27 | 28 | 28 | 27 | 28 | 27 | 27 |
| Melt Temp. °F. | 597 | 597 | 597 | 601 | 595 | 597 | 593 | 595 | 595 | 595 | 597 | 597 |
| No Surge/Surge Speed (ft/min) | 640 | 600 | 100 | 120 | 440 | 600 | 440 | 1100 | 1100 | 1100 | 360 | 400 |
| Barrel temp. °C. | | | | | | | | | | | | |
| Zone 6 | 150 | 150 | 125 | 150 | 150 | 150 | 150 | 150 | 150 | 150 | 150 | 150 |
| zone 5 | 250 | 250 | 250 | 275 | 250 | 250 | 250 | 250 | 250 | 250 | 250 | 250 |
| zone 4 | 275 | 275 | 275 | 290 | 275 | 275 | 275 | 275 | 275 | 275 | 275 | 275 |
| zone 3 | 325 | 325 | 325 | 335 | 325 | 325 | 325 | 325 | 325 | 325 | 325 | 325 |
| zone 2 | 325 | 325 | 325 | 335 | 325 | 325 | 325 | 325 | 325 | 325 | 325 | 325 |
| Die end zone 1 | 325 | 325 | 325 | 333 | 325 | 325 | 325 | 325 | 325 | 325 | 325 | 325 |

COATING PERFORMANCE AND PHYSICAL PROPERTIES

Coating performance and physical properties of extruded coatings for 12 runs was measured. The properties of the resins and coatings produced therefrom was determined by the following methods:

Density was determined according to ASTM D-1501-. A plaque was conditioned for one hour at 100° C. to approach equilibrium crystallinity. Density was reported as gms/cm$^3$.

Melt Index (MI) was determined according to ASTM D-1238-Condition E, measured at 190° C. and reported as grams per 10 minutes.

Flow Index (HLMI) was determined according to ASTM D-1238-Condition F, measured at 10 times the weight used in the melt index test above and reported as grams per minutes.

Melt flow Ratio (MFR) was calculated by dividing the Flow Index by the Melt Index.

Pinholes were determined by stirring 1% by weight methylene blue in isopropanol until blue dye is dissolved. The mixture is painted over a coated substrate and allowed to stand for about 6–10 seconds. Then, the mixture is wiped off, the number of pinholes over 3 square feet is observed, and the number of pinholes per square foot is calculated.

A heat seal test to determine minimum fusion temperature (MFT) was done as follows: A bar-type heat sealer having a one-inch wide sealing bar was used. An upper bar was heated and a lower bar offered a pressure point. Several one-inch wide samples of coated paper were cut out, placed together coated side to coated side, and inserted into the jaw area of the sealer. The sealer was activated. There was 30 psi air pressure on the sealer bar. Minimum fusion temperature was defined as the temperature setting that provides a fusion seal. Sealed samples were allowed to cool and slowly pulled apart manually. Fusion seal existed when there was a 100% bond between the coatings and the materials would not separate.

Adhesion was determined using a cellophane tape test for the coated paper. Strips of ¾ inch wide tape were applied to the coated side in the transferse direction of the coating. The coating was lightly scored at the edges of the cellophane tape. The edge of the tape near the coated paper was lifted and scored at 90° C. (to score sides). The tape was removed by peeling it from a coating by lifting a coated surface from a paper substrate. The backside of the coating was examined for relative amounts of fiber retained, which is a measure of adhesion. 100% fiber retained means the maximum amount of paper fiber was pulled away.

Table III hereinbelow show physical property and performance data of various resins and blends extruded in the extrusion coating apparatus at the conditions previously set forth herein. The results are as follows:

TABLE III

Extrusion Coating Performance and Physical Properties

| Run No. | Neck-In (Total Inches) | | | Maximum Coating Speed (FPM) | Pinholes Total/3ft$^2$ at 7#/ream | Heat Seal MFT °F. at 21#/ream | Adhesion % Fiber Bond 7#/ream |
|---|---|---|---|---|---|---|---|
| | 21#/ream | 15#/ream | 7#/ream | | | | |
| 1 | 1.4 | 1.3 | 1.05 | 640 | 4 | 345 | 100 |
| 2 | 0.98 | 0.9 | 0.7 | 600 | 9 | 345 | 100 |
| 3 | 4.1 | | | 100 | — | — | — |
| 4 | 4.2 | 3.7–5.6 | | 120 | — | — | — |
| 8 | 1.85 | 1.65 | 1.53 | 440 | 0 | 335 | 100 |
| 9 | 2.2 | 1.95 | 1.65 | 600 | 2 | 350 | 100 |
| 10 | 3.6 | 3.3 | 3.3 | 440 | — | — | — |
| 11 | 3.5 | 3.3 | 2.6 | 1100 | — | — | — |
| 12 | 3.4 | 3.0 | 2.0 | 1100 | — | — | — |
| 13 | 3.1 | 3.1 | 2.3 | 1100 | — | — | — |
| 14 | 2.25 | 2.1 | 2.0 | 400 | — | — | — |
| 15 | 2.6 | 2.4 | 2.3 | 360 | — | — | — |

As can be seen from the data in Table III, e.g., the blend of run 8 provides a good balance of neck-in to coating speed. Also, the blend of run 9 can be used when higher extrusion coating speeds are required. The blends of runs 8 and 9 gave 1.8 inch and 2.2 inch neck-in and 440 and 600 ft/min coating speeds, respectively. Both blends (runs 8 and 9) provided pinhole resistance better than the unmodified "high pressure" resin of run 1 when compared at a coating weight of 7 lbs/ream (0.5 mils) combined 40 lbs/ream natural Kraft paper. Additionally, both blends (runs 8 and 9) provided excellent adhesion to the Kraft paper equal to that of the unmodified "high pressure" resin of run 1. Heat seal temperatures for the blends of runs 8 and 9 were 5° to 10° F. higher than for the "high pressure" resin of run 1, a difference which does not hinder heat seal performance.

EXAMPLES 16-30

Resins and blends were prepared as described for examples 1-15 and extrusion coated on a paper substrate utilizing the procedures and equipment described for examples 1-15. Table IV hereinbelow defines the maximum running speed and neck-in at extrusion conditions of 30 RPM, 36.8 lbs/hr, 307° C. melt temperature at 325° C. die temperature. The die width was 12 inches and the draw distance was about 5 inches.

As can be seen from Table IV below, significant improvements in maximum running speed by using blends are achieved compared to use of the resins alone as extrusion coating composition. Neck-in increased with increased amounts of linear, low density ethylene hydrocarbon copolymer in the blend. The coatings obtained with blends as set forth in Table IV were free of pinholes and showed good adhesion.

TABLE I

| Example | Blend | Maximum Running Speed (ft/min) | Neck-in (inches) at 80ft/min | 120ft/min | 250 ft/min |
|---|---|---|---|---|---|
| 16 | resin of example 1 | 650 | 1⅜ | 1⅜ | 1 |
| 17 | 80% resin of example 1; 20% resin of example 5 | 700 | 2¼ | 1¾ | 1⅜ |
| 18 | 60% resin of example 1; 40% resin of example 5 | 1000 | 2½ | 2¼ | 1½ |
| 19 | 40% resin of example 1; 60% resin of example 5 | 1000 | 3¼ | 2⅞ | 2⅛ |
| 20 | 20% resin of example 1; 80% resin of example 5 | 800 | 3½ | 3⅜ | 3¼ |
| 21 | resin of example 2 | 600 | 1 | .9 | .7 |
| 22 | 80% resin of example 2; 20% resin of example 5 | 600 | 1¼ | 1 | ⅞ |
| 23 | 60% resin of example 2; 40% resin of example 5 | 600 | 1¼ | 1⅜ | 1 |
| 24 | 40% resin of example 2; 60% resin of example 5 | 620 | 1¼ | 1⅜ | 1⅛ |
| 25 | 25% resin of example 2; 75% resin of example 5 | 1100 | 3.1 | 3.1 | 3.1 |
| 26 | resin of example 5 | 120 | 4.2 | 3.7–5.6 | |
| 27 | 60% resin of example 1; 40% resin of example 6 | 400 | 1⅜ | 1¼ | 1⅛ |

| Example | Blend | Maximum Running Speed (ft/min) | Neck-in (inches) at 9ft/min | 120ft/min | 250 ft/min |
|---|---|---|---|---|---|
| 28 | 80% resin of example 1; 40% resin of example 6 | 500 | 1⅜ | 1¼ | 1⅛ |
| 29 | 80% resin of example 7; 20% resin of example 6 | 400 | 1⅜ | 1¼ | 1⅛ |
| 30 | 35% resin of example 2; 65% resin of example 7 | 1100 | 3.4 | 3.0 | 2.0 |

What is claimed is:

1. In a process for the extrusion coating of a substrate with a high pressure, low density polyethylene homopolymer or copolymer extrusion coating composition, the improvement which comprises:

using as said composition one comprising more than 20 and less than 98 weight percent of said high pressure, low density polyethylene homopolymer and/or copolymer said homopolymer and copolymer having a density up to about 0.93 and more than 2 and less than 80 weight percent of at least one linear low density ethylene hydrocarbon copolymer said copolymer having a density of about 0.912 to about 0.940.

2. In a process for applying an extruded coating to a substrate at a temperature of at least 450° F. wherein a coating composition containing a high pressure, low density polyethylene homopolymer or copolymer is fed into an extruder and converted into an extrudate which is drawn down onto a substrate to coat said substrate, said coating being essentially free of pinholes and having a thickness below about 0.5 mil, the improvement which comprises:

using as said coating composition one comprising more than 20 and less than 98 weight percent of said high pressure, low density polyethylene homopolymer and/or copolymer said homopolymer and copolymer having a density up to about 0.93 and more than 2 and less than 80 weight percent of a linear, low density ethylene hydrocarbon copolymer said copolymer having a density of about 0.912 to about 0.940; and operating said extruder at coating speeds greater than 600 feet per minute to apply said coating to said substrate, in the absence of neck-in greater than about 3 inches.

3. A process as defined in claims 1 or 2 wherein said high pressure, low density polyethylene homopolymer or copolymer has a melt index between about 1 and about 20.

4. A process as defined in claims 1 or 2 wherein said high pressure, low density polyethylene homopolymer or copolymer has a melt index between about 2 and about 6.

5. A process as defined in claims 1 or 2 wherein said high pressure, low density polyethylene homopolymer is a homopolymer of ethylene having a melt index between about 2 and about 6.

6. A process as defined in claims 1 or 2 wherein said high pressure, low density polyethylene copolymer is a copolymer of ethylene ethyl acrylate and ethylene vinyl acetate having a melt index between about 2 and about 6.

7. A process as defined in claim 1 wherein the high pressure, low density polyethylene homopolymer or copolymer is present in an amount between about 30 and 90 weight percent, and said linear low density ethylene hydrocarbon copolymer is present in an amount between about 10 and 70 weight percent.

8. A process as defined in claim 2 wherein the high pressure, low density polyethylene homopolymer or copolymer is present in an amount between about 30 and 90 weight percent, and said linear low density ethylene hydrocarbon copolymer is present in an amount between about 10 and 70 weight percent.

9. A process as defined in claim 7 wherein the high pressure, low density polyethylene homopolymer or copolymer is present in an amount between about 40 and 80 weight percent, and said linear low density ethylene hydrocarbon copolymer is present in an amount between about 20 and 60 weight percent.

10. A process as defined in claim 8 wherein the high pressure, low density polyethylene homopolymer or copolymer is present in an amount between about 40 and 80 weight percent, and said linear low density ethylene hydrocarbon copolymer is present in an amount between about 20 and 60 weight percent.

11. A process as defined in claims 1 or 2 wherein high pressure, low density polyethylene homopolymer or copolymer is present in an amount less than about 50% by weight.

12. A process as defined in claim 9 wherein said linear low density ethylene hydrocarbon copolymer is a copolymer of ethylene and at least one $C_3$–$C_8$ alpha olefin having a melt index between about 0.5 and about 100.

13. A process as defined in claim 10 wherein said linear low density ethylene hydrocarbon copolymer is a copolymer of ethylene and at least one $C_3$–$C_8$ alpha olefin having a melt index between about 0.5 and about 100.

14. A process as defined in claim 12 wherein said melt index is between about 2 and about 50.

15. A process as defined in claim 13 wherein said melt index is between about 2 and about 50.

16. A process as defined in claim 12 wherein said melt index is between about 10 and about 30.

17. A process as defined in claim 13 wherein said melt index is between about 10 and about 30.

18. A process as defined in claim 1 wherein said linear low density ethylene hydrocarbon copolymer is a copolymer of greater than about 25 mol percent ethylene and less than about 15 mol percent of at least one $C_3$–$C_8$ alpha olefin.

19. A process as defined in claim 2 wherein said linear low density ethylene hydrocarbon copolymer is a copolymer of greater than about 25 mol percent ethylene and less than about 15 mol percent of at least one $C_3$–$C_8$ alpha olefin.

20. A process as defined in claim 14 wherein said copolymer has a melt flow ratio of about $\geq 22$ to $\leq 36$ and a total unsaturation content of about $\geq 0.1$ to $\leq 0.3$ C=/1000 C atoms.

21. A process as defined in claim 15 wherein said copolymer has a melt flow ratio of about $\geq 22$ to $\leq 36$ and a total unsaturation content of about $\geq 0.1$ to $\leq 0.3$ C=C/1000 C atoms.

22. A process as defined in claims 18 or 19 wherein the alpha olefin comprises butene-1.

23. A coated article wherein the coating comprises a blend of more than 20 and less than 98 weight percent of high pressure, low density polyethylene homopolymer and/or copolymer said homopolymer and copolymer having a density up to about 0.93 and more than 2 and less than 80 weight percent of at least one linear, low density ethylene hydrocarbon copolymer said copolymer having a density of about 0.912 to about 0.940; produced as defined in claim 1.

* * * * *

UNITED STATES PATENT AND TRADEMARK OFFICE
CERTIFICATE OF CORRECTION

PATENT NO. : 4,339,507

DATED : July 13, 1982

INVENTOR(S) : Stuart J. Kurtz and Howard G. Apgar, Jr.

It is certified that error appears in the above—identified patent and that said Letters Patent is hereby corrected as shown below:

Column 9, line 11; "a6plication" should read  -- application --.

Column 10, line 30; "unmelting" should read  -- unmelted --.

Claim 20, line 20; "C=/" should read  -- C=C/ --.

Signed and Sealed this

Tenth Day of May 1983

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,339,507

DATED : July 13, 1982

INVENTOR(S) : S.J. Kurtz et al

It is certified that error appears in the above-identified patent and that said Letters Patent is hereby corrected as shown below:

| | |
|---|---|
| Column 1, line 66 | "alkalis" should read -- alkalies -- |
| Column 2, line 26 | "boundry" should read -- boundary -- |
| Column 6, line 58 | "molecular distribution" should read -- molecular weight distribution -- |
| Column 7, line 60 | delete first appearing "ethyl" |
| Column 8, line 23 | "percent)" should read -- percent -- |
| Column 8, line 53 | first appearing "32" should read -- 36 -- |
| Column 8, line 55, | "32" should read -- 36 -- |
| Column 10, line 12 | "Henshel" should read -- Henschel -- |
| Column 10, line 63 | "than that" should read -- than -- |
| Column 12, line 67 | "varies" should read -- vary -- |
| Column 13, line 28 | "was" should read -- were -- |

UNITED STATES PATENT AND TRADEMARK OFFICE
CERTIFICATE OF CORRECTION

PATENT NO. : 4,339,507

DATED : July 13, 1982

INVENTOR(S) : S.J. Kurtz et al

It is certified that error appears in the above-identified patent and that said Letters Patent is hereby corrected as shown below:

| | |
|---|---|
| Column 13, line 67 | "transferse" should read -- transverse -- |
| Column 14, line 33 | "show" should read -- shows -- |
| Column 14, line 65 | "combined 40" should read -- combined with 40 -- |
| Column 15, line 22 | "Table I" should read -- Table IV -- |
| Column 16, line 1 | "Table I" should read -- Table IV -- |

Signed and Sealed this

Eleventh Day of February 1986

[SEAL]

Attest:

DONALD J. QUIGG

Attesting Officer

Commissioner of Patents and Trademarks